United States Patent
Saito et al.

(10) Patent No.: US 10,231,468 B2
(45) Date of Patent: Mar. 19, 2019

(54) METHOD FOR PRODUCING FAT AND OIL COMPOSITION

(71) Applicant: KAO CORPORATION, Chuo-ku (JP)

(72) Inventors: Katsuyoshi Saito, Sumida-ku (JP); Masao Shimizu, Edogawa-ku (JP)

(73) Assignee: KAO CORPORATION, Tokyo (JP)

( * ) Notice: Subject to any disclaimer, the term of this patent is extended or adjusted under 35 U.S.C. 154(b) by 544 days.

(21) Appl. No.: 14/368,681

(22) PCT Filed: Dec. 25, 2012

(86) PCT No.: PCT/JP2012/083385
§ 371 (c)(1),
(2) Date: Jun. 25, 2014

(87) PCT Pub. No.: WO2013/099830
PCT Pub. Date: Jul. 4, 2013

(65) Prior Publication Data
US 2015/0030750 A1 Jan. 29, 2015

(30) Foreign Application Priority Data
Dec. 28, 2011 (JP) .................................. 2011-288336

(51) Int. Cl.
| *A23D 9/02* | (2006.01) |
| *C11B 7/00* | (2006.01) |
| *A23D 9/013* | (2006.01) |
| *A23D 9/04* | (2006.01) |
| *A23D 9/007* | (2006.01) |

(52) U.S. Cl.
CPC ............... *A23D 9/02* (2013.01); *A23D 9/007* (2013.01); *A23D 9/013* (2013.01); *A23D 9/04* (2013.01); *C11B 7/0075* (2013.01); *C11B 7/0083* (2013.01)

(58) Field of Classification Search
CPC . A23D 9/02; A23D 9/04; A23D 9/007; A23D 9/013; C11B 7/0075; C11B 7/0083
USPC ....................................................... 426/601
See application file for complete search history.

(56) References Cited

U.S. PATENT DOCUMENTS

| 5,773,073 A * | 6/1998 | Matsuda ................ A23D 7/015 |
| | | 426/601 |
| 6,004,611 A | 12/1999 | Gotoh et al. |
| 2002/0025370 A1 | 2/2002 | Sugiura et al. |
| 2004/0030169 A1 | 2/2004 | Kase et al. |
| 2008/0069932 A1* | 3/2008 | Kohori ................... A23D 9/007 |
| | | 426/541 |

FOREIGN PATENT DOCUMENTS

| CN | 1396250 A | 2/2003 |
| CN | 1324119 C | 7/2007 |
| JP | 4 300826 | 10/1992 |
| JP | 10 176181 | 6/1998 |
| JP | 2002 20782 | 1/2002 |
| JP | 2004 43702 | 2/2004 |
| JP | 2004 67998 | 3/2004 |
| JP | 2004 189965 | 7/2004 |
| JP | 2005 146098 | 6/2005 |
| JP | 2009-159829 A | 7/2009 |
| WO | 2008 053838 | 5/2008 |

OTHER PUBLICATIONS

International Preliminary Report on Patentability with Written Opinion dated Jul. 10, 2014 in PCT/JP2012/083385(English Translation only).
International Search Report dated Feb. 19, 2013 in PCT/JP12/083385 Filed Dec. 25, 2012.

* cited by examiner

*Primary Examiner* — Jeffrey P Mornhinweg
(74) *Attorney, Agent, or Firm* — Oblon, McClelland, Maier & Neustadt, L.L.P.

(57) ABSTRACT

Provided is a production method which can produce, with a high yield, a fat or oil composition containing a diacylglycerol at a high content and having a favorable external appearance at room temperature. Specifically, provided is a production method for a refined fat or oil composition, comprising the following steps (1) and (2): (1) a step of adding a polyglycerin fatty acid ester having an average polymerization degree of glycerin being 20 or more to a fat or oil composition containing 50 mass % or more of diacylglycerol, followed by cooling; and (2) a step of separating a crystal precipitated in the step (1) from a liquid portion.

19 Claims, No Drawings

METHOD FOR PRODUCING FAT AND OIL COMPOSITION

FIELD OF THE INVENTION

The present invention relates to a production method for a fat or oil composition and a solid-liquid separation method for a fat or oil composition.

BACKGROUND OF THE INVENTION

A fat or oil containing diacylglycerol at a high concentration is known to have physiological effects such as suppression of an increase in blood triglyceride (neutral fat) level after meal and a small accumulation amount in the body (see Patent Documents 1 and 2, for example). On the other hand, diacylglycerol has a melting point higher than that of triacylglycerol and hence is liable to crystallize at low temperature, and crystals precipitated are hard to dissolve even if returning to room temperature.

As a method of suppressing crystallization of a fat or oil to provide a clear fat or oil, there has been known a method involving removing components having a high melting point in advance by wintering. For the fat or oil containing diacylglycerol at a high concentration, there has been reported a method involving adding an emulsifier as a separation aid during wintering and performing solid-liquid separation of crystals precipitated (Patent Document 3).

CITATION LIST

Patent Document

[Patent Document 1] JP-A-4-300826
[Patent Document 2] JP-A-10-176181
[Patent Document 3] JP-A-2002-20782

SUMMARY OF THE INVENTION

The present invention provides a production method for a refined fat or oil composition, comprising the following steps (1) and (2):

(1) a step of adding a polyglycerin fatty acid ester having an average polymerization degree of glycerin being 20 or more to a fat or oil composition containing 40 mass % or more of diacylglycerol, followed by cooling; and (2) a step of separating a crystal precipitated in the step (1) from a liquid portion.

The present invention provides a solid-liquid separation method for a fat or oil composition, comprising the following steps (1) and (2):

(1) a step of adding a polyglycerin fatty acid ester having an average polymerization degree of glycerin being 20 or more to a fat or oil composition containing 40 mass % or more of diacylglycerol, followed by cooling; and (2) a step of separating a crystal precipitated in the step (1) and a liquid portion.

DETAILED DESCRIPTION OF THE INVENTION

However, the above-mentioned method of Patent Document 3 has problems in that the yield after separation is low, and in that the taste and flavor of the fat or oil are liable to deteriorate because a large amount of the emulsifier is required.

Therefore, the present invention relates to providing an efficient production method for a fat or oil composition containing diacylglycerol at a high content and having a favorable external appearance at room temperature.

The inventors of the present invention found that, when a polyglycerin fatty acid ester having a high polymerization degree is added to a fat or oil containing diacylglycerol at a high content, crystals precipitated can be separated readily and efficiently. In addition, the inventors found that, a fat or oil which has been subjected to the step has a favorable external appearance because even if crystals are precipitated at low temperature, the crystals are readily dissolved when returned to at room temperature.

According to the present invention, it is possible to readily separate components having a high melting point in a fat or oil to produce, with a high yield, a fat or oil composition containing diacylglycerol at a high content and having a favorable external appearance at room temperature. In addition, the method according to the present invention can reduce the amount of an emulsifier used.

The production method for a refined fat or oil composition and solid-liquid separation method for a fat or oil composition according to the present invention each comprise the steps of: (1) adding a specific polyglycerin fatty acid ester to a fat or oil composition containing diacylglycerol at a high concentration, followed by cooling; and (2) separating a crystal precipitated by the cooling from a liquid portion.

The fat or oil composition according to the present invention contains 40 mass % (hereinafter referred to as "%") or more of the diacylglycerol. From the viewpoint of a physiological effect, the fat or oil composition contains preferably 50% or more, more preferably 55% or more, even more preferably 60% or more of the diacylglycerol, and from the viewpoint of industrial productivity, the fat or oil composition contains preferably 98% or less, more preferably 95% or less, more preferably 93% or less, even more preferably 92% or less of the diacylglycerol. In addition, the fat or oil composition contains preferably from 50 to 98%, more preferably from 55 to 95%, more preferably from 55 to 93%, even more preferably from 60 to 92% of the diacylglycerol. It should be noted that the "fat or oil" in the present invention includes one or more of triacylglycerol, diacylglycerol, or monoacylglycerol.

The constituent fatty acids of the diacylglycerol are not particularly limited and may include saturated fatty acids or unsaturated fatty acids. The content of the saturated fatty acids is preferably from 0 to 20% from the viewpoint of allowing the effect of the present invention to be exhibited effectively. The content of the saturated fatty acids in the constituent fatty acids is more preferably 1% or more, even more preferably 2% or more, from the viewpoint of external appearance, and is more preferably 15% or less, even more preferably 10% or less, from the viewpoint of the physiological effect. In addition, the content is more preferably from 0 to 15%, even more preferably from 2 to 10%. The saturated fatty acids each have preferably from 14 to 24 carbon atoms, more preferably from 16 to 22 carbon atoms.

In addition, the content of the unsaturated fatty acids in the constituent fatty acids of the diacylglycerol is preferably 80% or more, more preferably 85% or more, even more preferably 90% or more, from the viewpoints of the external appearance and physiological effect, and is preferably 100% or less, more preferably 99% or less, even more preferably 98% or less, from the viewpoint of industrial productivity of the fat or oil. In addition, the content is preferably from 80 to 100%, more preferably from 85 to 99%, even more preferably from 90 to 98%. The unsaturated fatty acids each have preferably from 14 to 24 carbon atoms, more preferably from 16 to 22 carbon atoms, from the viewpoint of the physiological effect.

In addition, the content of a trans-unsaturated fatty acid in the constituent fatty acids of the diacylglycerol is preferably from 0.01 to 5%, more preferably from 0.01 to 3.5%, even more preferably from 0.01 to 3%, from the viewpoints of the physiological effect and external appearance.

The content of the triacylglycerol in the fat or oil composition is preferably from 0.1 to 60%, more preferably from 1 to 60%, even more preferably from 5 to 60%, from the viewpoint of the industrial productivity of the fat or oil. Further, the content of the monoacylglycerol is preferably 5% or less, more preferably from 0 to 2%, even more preferably from 0.1 to 1.5%, from the viewpoint of improving the taste and flavor. The content of a free fatty acid (salt) is preferably 3.5% or less, more preferably from 0.01 to 1.5%, from the viewpoint of, for example, the taste and flavor or the like.

The fat or oil composition containing diacylglycerol at a high content can be obtained through, for example, an esterification reaction between fatty acids derived from a fat or oil and glycerin, or a glycerolysis reaction between the fat or oil and glycerin. These reactions are broadly classified into: chemical methods using a chemical catalyst such as an alkali metal or an alloy thereof, or an oxide, hydroxide, or alkoxide having 1 to 3 carbon atoms of an alkali metal or an alkali earth metal; and enzymatic methods using an enzyme such as a lipase. Of these, the reactions are preferably carried out under enzymatically mild conditions by using a lipase or the like as the catalyst in view of obtaining excellent taste and flavor or the like.

The fat or oil may be any of a vegetable fat or oil and an animal fat or oil. As specific raw materials, there may be given rapeseed oil (canola oil), sunflower oil, corn oil, soybean oil, linseed oil, rice oil, safflower oil, cottonseed oil, palm oil, coconut oil, olive oil, grapeseed oil, avocado oil, sesami oil, peanut oil, macademia nut oil, haselnut oil, walnut oil, lard, beef tallow, chicken oil, butter oil, fish oil, and the like. Further, it is also possible to use, as a raw material, a fat or oil prepared by fractionating and mixing these fats or oils, or a fat or oil prepared by adjusting the fatty acid composition of any of these fats or oils through hydrogenation, a transesterification reaction, or the like. However, an unhydrogenated fat or oil is preferred from the viewpoint of reducing the content of the trans-unsaturated fatty acid in all the constituent fatty acids of the fat or oil.

The polyglycerin fatty acid ester to be used in the present invention is obtained by esterifying polyglycerin and a fatty acid. The average polymerization degree of glycerin in the polyglycerin fatty acid ester is 20 or more, is preferably 22 or more, from the viewpoint of efficient separation of components having a high melting point in the fat or oil, and is preferably 50 or less, more preferably 45 or less, from the same viewpoint. In addition, the average polymerization degree is preferably from 20 to 50, more preferably from 20 to 45, even more preferably from 22 to 45. The term "average polymerization degree of glycerin" refers to a value determined by measuring the polymerization degree of a polyglycerin portion in the polyglycerin fatty acid ester by GPC.

The constituent fatty acids of the polyglycerin fatty acid ester are not particularly limited and may be saturated fatty acids or unsaturated fatty acids.

The content of the saturated fatty acids in the constituent fatty acids of the polyglycerin fatty acid ester is preferably 20% or more, more preferably from 20 to 100%, more preferably from 30 to 100%, more preferably from 40 to 100%, even more preferably from 50 to 100%, from the viewpoint of efficient separation of components having a high melting point in the fat or oil. The saturated fatty acids each have, for example, from 10 to 22 carbon atoms, preferably from 12 to 18 carbon atoms, more preferably from 16 to 18 carbon atoms. The content of the saturated fatty acids each having from 16 to 18 carbon atoms in the constituent fatty acids of the polyglycerin fatty acid ester is preferably from 30 to 100%, more preferably from 50 to 100%, from the same viewpoint as above.

In addition, the content of the unsaturated fatty acids in the constituent fatty acids of the polyglycerin fatty acid ester is preferably 80% or less, more preferably from 0 to 75%, more preferably from 0 to 60%, even more preferably from 0 to 40%, from the viewpoint of efficient separation of components having a high melting point in the fat or oil. The unsaturated fatty acids each have, for example, from 14 to 24 carbon atoms, preferably from 16 to 22 carbon atoms.

The hydroxyl value of the polyglycerin fatty acid ester is preferably 80 mg-KOH/g or less, more preferably from 3 to 80 mg-KOH/g, from the viewpoint of maintaining a favorable external appearance. The term "hydroxyl value" in the present invention refers to a value measured by the Standard Methods for the Analysis of Fats, Oils and Related Materials described in Examples.

The polyglycerin fatty acid ester is added in an amount of, relative to the amount of the fat or oil composition, preferably 1 ppm or more, more preferably 2 ppm or more, even more preferably 5 ppm or more, from the viewpoint of suppressing crystallization of the diacylglycerol, and is preferably 1,000 ppm or less, more preferably 100 ppm or less, more preferably 80 ppm or less, even more preferably 60 ppm or less, from the viewpoints of taste and flavor and cooking property. In addition, the polyglycerin fatty acid ester is added in an amount of preferably from 1 to 1,000 ppm, more preferably from 1 to 100 ppm, more preferably from 2 to 80 ppm, even more preferably from 5 to 60 ppm. Two or more of polyglycerin fatty acid esters may be used in combination.

In addition, the polyglycerin fatty acid ester is added in an amount of, relative to 100 parts by mass of the fat or oil composition, preferably 0.0001 part by mass or more, more preferably 0.0002 part by mass or more, even more preferably 0.0005 part by mass or more, from the viewpoint of suppressing crystallization of the diacylglycerol, and is preferably 10 parts by mass or less, more preferably 0.1 part by mass or less, more preferably 0.01 part by mass or less, more preferably 0.008 part by mass or less, even more preferably 0.006 part by mass or less, from the viewpoints of taste and flavor and cooking property. In addition, the polyglycerin fatty acid ester is added in an amount of preferably from 0.0001 to 0.1 part by mass, more preferably from 0.0001 to 0.01 part by mass, more preferably from 0.0002 to 0.008 part by mass, even more preferably from 0.0005 to 0.006 part by mass relative to 100 parts by mass of the fat or oil composition.

In the present invention, the temperature for cooling the fat or oil composition may be a temperature at which components having a high melting point are crystallized and precipitated, and is preferably −3° C. or more, more preferably 0° C. or more, and is preferably 20° C. or less, more preferably 15° C. or less. In addition, the temperature ranges preferably from −3° C. to 20° C., more preferably from 0° C. to 15° C. When the fat or oil composition is cooled to a temperature in the above-mentioned range, it is possible to grow crystals of the components having a high melting point to a size appropriate for separation.

The time for cooling varies depending on the amount of raw materials and cooling capacity, and may be appropriately selected depending on the composition of the fat or oil composition. In general, the time for cooling is from 0.5 to 100 hours, preferably about from 0.8 to 90 hours, even more preferably from 1 to 80 hours.

A method of separating crystals precipitated from a liquid portion after cooling is not particularly limited, and examples thereof include filtration, centrifugation, and separation by sedimentation. The temperature for separation is preferably the same as the temperature for cooling the fat or oil composition.

The method according to the present invention can separate and remove components having a high melting point from a fat or oil composition to provide a refined fat or oil composition containing diacylglycerol at a high concentration and having a favorable external appearance at room temperature. According to the method of the present invention, it is possible to preferably separate and remove, as the components having a high melting point, a fat or oil containing saturated fatty acids as constituent fatty acids, and to more preferably separate and remove a fat or oil containing saturated fatty acids each having from 14 to 24 carbon atoms as constituent fatty acids.

In the method of the present invention, the yield (yield rate) of the refined fat or oil composition obtained from the fat or oil composition is preferably 60% or more, more preferably 70% or more, even more preferably 75% or more, from the viewpoint of production efficiency.

The content of the diacylglycerol in the refined fat or oil composition is preferably 40% or more, more preferably 45% or more, even more preferably 50% or more, from the viewpoints of the physiological effect and industrial productivity of the fat or oil. The upper limit is not particularly limited, and is preferably 99% or less, more preferably 98% or less, even more preferably 97% or less, from the viewpoint of the industrial productivity of the fat or oil. In addition, the content is preferably from 40 to 99%, more preferably from 45 to 98%, even more preferably from 50 to 97%.

The refined fat or oil composition obtained by the production method and solid-liquid separation method according to the present invention has a favorable external appearance at room temperature and hence is useful as a liquid fat or oil. It should be noted that the liquid fat or oil refers to a fat or oil which is liquid at 20° C. in a cooling test described in The Standard Methods for the Analysis of Fats, Oils and Related Materials 2.3.8-27.

The refined fat or oil composition according to the present invention can be used in the same way as a general edible fat or oil, and can be applied widely to various foods and drinks using fats or oils.

The present invention further discloses the following methods relating to the above-mentioned embodiments.

<1> A production method for a refined fat or oil composition, comprising the following steps (1) and (2):

(1) a step of adding a polyglycerin fatty acid ester having an average polymerization degree of glycerin being 20 or more to a fat or oil composition containing 40 mass % or more of diacylglycerol, followed by cooling; and (2) a step of separating a crystal precipitated in the step (1) from a liquid portion.

<2> The production method for a refined fat or oil composition according to Item <1>, in which the content of the diacylglycerol in the fat or oil composition is preferably 50 mass % or more, more preferably 55 mass % or more, more preferably 60 mass % or more, is preferably 98 mass % or less, more preferably 95 mass % or less, more preferably 93 mass % or less, even more preferably 92 mass % or less, and is more preferably from 50 to 98 mass %, more preferably from 55 to 95 mass %, more preferably from 55 to 93 mass %, even more preferably from 60 to 92 mass %.

<3> The production method for a refined fat or oil composition according to Item <1> or <2>, in which the content of saturated fatty acids in constituent fatty acids of the diacylglycerol is preferably 1 mass % or more, more preferably 2 mass % or more, is preferably 15 mass % or less, more preferably 10 mass % or less, and is more preferably from 0 to 15 mass %, even more preferably from 2 to 10 mass %.

<4> The production method for a refined fat or oil composition according to Item <3>, in which the saturated fatty acids are saturated fatty acids each having preferably from 14 to 24 carbon atoms, more preferably from 16 to 22 carbon atoms.

<5> The production method for a refined fat or oil composition according to any one of Items <1> to <4>, in which the average polymerization degree of glycerin in the polyglycerin fatty acid ester is preferably 22 or more, is preferably 50 or less, more preferably 45 or less, and is more preferably from 20 to 50, more preferably from 20 to 45, even more preferably from 22 to 45.

<6> The production method for a refined fat or oil composition according to any one of Items <1> to <5>, in which the content of the saturated fatty acids in the constituent fatty acids of the polyglycerin fatty acid ester is preferably 20 mass % or more, more preferably from 20 to 100 mass %, more preferably from 30 to 100 mass %, more preferably from 40 to 100 mass %, even more preferably from 50 to 100 mass %.

<7> The production method for a refined fat or oil composition according to Item <6>, in which the saturated fatty acids are saturated fatty acids each having preferably from 10 to 22 carbon atoms, more preferably from 12 to 18 carbon atoms, even more preferably from 16 to 18 carbon atoms.

<8> The production method for a refined fat or oil composition according to any one of Items <1> to <7>, in which the constituent fatty acids of the polyglycerin fatty acid ester contain preferably from 30 to 100 mass % of saturated fatty acids each having from 16 to 18 carbon atoms, more preferably from 50 to 100 mass % of saturated fatty acids each having from 16 to 18 carbon atoms.

<9> The production method for a refined fat or oil composition according to any one of Items <1> to <8>, in which the hydroxyl value of the polyglycerin fatty acid ester is preferably 80 mg-KOH/g or less, more preferably from 3 to 80 mg-KOH/g.

<10> The production method for a refined fat or oil composition according to any one of Items <1> to <9>, in which the polyglycerin fatty acid ester is added in an amount of preferably 1 ppm or more, more preferably 2 ppm or more, even more preferably 5 ppm or more, of 1,000 ppm or less, preferably 100 ppm or less, more preferably 80 ppm or less, even more preferably 60 ppm or less, and of preferably from 1 to 1,000 ppm, more preferably from 1 to 100 ppm, more preferably from 2 to 80 ppm, even more preferably from 5 to 60 ppm, relative to the fat or oil composition.

<11> The production method for a refined fat or oil composition according to any one of Items <1> to <9>, in which the polyglycerin fatty acid ester is added in an amount of preferably 0.0001 part by mass or more, more preferably 0.0002 part by mass or more, even more preferably 0.0005 part by mass or more, of preferably 10 parts by mass or less, more preferably 0.1 part by mass or less, more preferably 0.01 part by mass or less, more preferably 0.008 part by mass or less, even more preferably 0.006 part by mass or less, and of preferably from 0.0001 to 0.1 part by mass, more preferably from 0.0001 to 0.01 part by mass, more preferably from 0.0002 to 0.008 part by mass, even more preferably from 0.0005 to 0.006 part by mass, relative to 100 parts by mass of the fat or oil composition.

<12> The production method for a refined fat or oil composition according to any one of Items <1> to <11>, in which the fat or oil composition is cooled at a temperature of preferably −3° C. or more, more preferably 0° C. or more, of 20° C. or less, preferably 15° C. or less, and of more preferably from −3° C. to 20° C., even more preferably from 0 to 15° C.

<13> The production method for a refined fat or oil composition according to any one of Items <1> to <12>, in which the content of the diacylglycerol in the refined fat or oil composition is preferably 40 mass % or more, more preferably 45 mass % or more, even more preferably 50 mass % or more, is preferably 99 mass % or less, more preferably 98 mass % or less, even more preferably 97 mass % or less, and is more preferably from 40 to 99 mass %, more preferably from 45 to 98 mass %, even more preferably from 50 to 97 mass %.

<14> A solid-liquid separation method for a fat or oil composition, comprising the following steps (1) and (2):

(1) a step of adding a polyglycerin fatty acid ester having an average polymerization degree of glycerin being 20 or more to a fat or oil composition containing 40 mass % or more of diacylglycerol, followed by cooling; and (2) a step of separating a crystal precipitated in the step (1) and a liquid portion.

<15> The solid-liquid separation method for a fat or oil composition according to Item <14>, in which the content of the diacylglycerol in the fat or oil composition is preferably 50 mass % or more, more preferably 55 mass % or more, more preferably 60 mass % or more, is preferably 98 mass % or less, more preferably 95 mass % or less, more preferably 93 mass % or less, even more preferably 92 mass % or less, and is more preferably from 50 to 98 mass %, more preferably from 55 to 95 mass %, more preferably from 55 to 93 mass %, even more preferably from 60 to 92 mass %.

<16> The solid-liquid separation method for a fat or oil composition according to Item <14> or <15>, in which the content of saturated fatty acids in constituent fatty acids of the diacylglycerol is preferably 1 mass % or more, more preferably 2 mass % or more, is preferably 15 mass % or less, more preferably 10 mass % or less, and is more preferably from 0 to 15 mass %, even more preferably from 2 to 10 mass %.

<17> The solid-liquid separation method for a fat or oil composition according to Item <16>, in which the saturated fatty acids are saturated fatty acids each having preferably from 14 to 24 carbon atoms, more preferably from 16 to 22 carbon atoms.

<18> The solid-liquid separation method for a fat or oil composition according to any one of Items <14> to <17>, in which the average polymerization degree of glycerin in the polyglycerin fatty acid ester is preferably 22 or more, is 50 or less, preferably 45 or less, and is more preferably from 20 to 50, more preferably from 20 to 45, even more preferably from 22 to 45.

<19> The solid-liquid separation method for a fat or oil composition according to any one of Items <14> to <18>, in which the content of the saturated fatty acids in the constituent fatty acids of the polyglycerin fatty acid ester is preferably 20 mass % or more, more preferably from 20 to 100 mass %, more preferably from 30 to 100 mass %, more preferably from 40 to 100 mass %, even more preferably from 50 to 100 mass %.

<20> The solid-liquid separation method for a fat or oil composition according to Item <19>, in which the saturated fatty acids are saturated fatty acids each having preferably from 10 to 22 carbon atoms, more preferably from 12 to 18 carbon atoms, even more preferably from 16 to 18 carbon atoms.

<21> The solid-liquid separation method for a fat or oil composition according to any one of Items <14> to <20>, in which the constituent fatty acids of the polyglycerin fatty acid ester contain preferably from 30 to 100 mass % of saturated fatty acids each having from 16 to 18 carbon atoms, more preferably from 50 to 100 mass % of saturated fatty acids each having from 16 to 18 carbon atoms.

<22> The solid-liquid separation method for a fat or oil composition according to any one of Items <14> to <21>, in which the hydroxyl value of the polyglycerin fatty acid ester is preferably 80 mg-KOH/g or less, more preferably from 3 to 80 mg-KOH/g.

<23> The solid-liquid separation method for a fat or oil composition according to any one of Items <14> to <22>, in which the polyglycerin fatty acid ester is added in an amount of preferably 1 ppm or more, more preferably 2 ppm or more, even more preferably 5 ppm or more, of 1,000 ppm or less, preferably 100 ppm or less, more preferably 80 ppm or less, even more preferably 60 ppm or less, and of preferably from 1 to 1,000 ppm, more preferably from 1 to 100 ppm, more preferably from 2 to 80 ppm, even more preferably from 5 to 60 ppm, relative to the fat or oil composition.

<24> The solid-liquid separation method for a fat or oil composition according to any one of Items <14> to <23>, in which the polyglycerin fatty acid ester is added in an amount of preferably 0.0001 part by mass or more, more preferably 0.0002 part by mass or more, even more preferably 0.0005 part by mass or more, of preferably 10 parts by mass or less, more preferably 0.1 part by mass or less, more preferably 0.01 part by mass or less, more preferably 0.008 part by mass or less, even more preferably 0.006 part by mass or less, and of preferably from 0.0001 to 0.1 part by mass, more preferably from 0.0001 to 0.01 part by mass, more preferably from 0.0002 to 0.008 part by mass, even more preferably from 0.0005 to 0.006 part by mass, relative to 100 parts by mass of the fat or oil composition.

<25> The solid-liquid separation method for a fat or oil composition according to any one of Items <14> to <24>, in which the fat or oil composition is cooled at a temperature of preferably −3° C. or more, more preferably 0° C. or more, of 20° C. or less, preferably 15° C. or less, and of more preferably from −3° C. to 20° C., even more preferably from 0 to 15° C.

EXAMPLES (Analysis Methods)

(i) Composition of Constituent Fatty Acids of Oil and Fat

In accordance with "Preparation of methyl esters of fatty acids (2.4.1.-1996)" in "The Standard Methods for the Analysis of Fats, Oils and Related Materials" edited by Japan Oil Chemists' Society, fatty acid methyl esters were prepared. The resultant samples were measured by American Oil Chemists. Society Official Method Ce 1f-96 (GLC method).

(ii) Composition of Glycerides in Fat or Oil

About 10 mg of a fat or oil sample and 0.5 mL of a trimethylsilylating agent ("Silylating agent TH," manufactured by Kanto Chemical Co., Inc.) were placed in a glass sample bottle, and the bottle was sealed and heated at 70° C. for 15 minutes. 1.0 mL of water and 1.5 mL of hexane were added thereto, and the bottle was shaken. The bottle was allowed to stand still, and then the upper layer was analyzed by gas-liquid chromatography (GLC).

<GLC Conditions>

(Conditions)

Apparatus: Agilent 6890 Series (manufactured by Agilent Technologies)

Integrator: ChemStation B 02.01 SR2 (manufactured by Agilent Technologies)

Column: DB-1ht (manufactured by Agilent J&W)

Carrier gas: 1.0 mL He/min

Injector: Split (1:50), T=340° C.

Detector: FID, T=350° C.

Oven temperature: increased from 80° C. to 340° C. at 10° C./min and kept for 15 minutes (iii) Hydroxyl Value of Polyglycerin Fatty Acid Ester In accordance with "Hydroxyl value (pyridine-acetic anhydride method 2.3.6.2-1996)" in "Standard Methods for the Analysis of Fats, Oils and Related Materials, 2003" edited by Japan Oil Chemists' Society, the hydroxyl value was analyzed. 25 g of acetic anhydride was put into a 100-mL measuring flask, and pyridine was added up to the marked line, followed by mixing to prepare an acetylating reagent. About 5 g of a sample was weighed in a round-bottom flask with a long neck. 5 ml of the acetylating reagent was added thereto and a small funnel was put in the neck of the flask. The bottom portion of the flask was immersed in a heating bath up to a depth of about 1 cm and was heated to a temperature of 95 to 100° C. One hour later, the flask was taken out from the heating bath and was cooled. 1 ml of distilled water was added into the flask through the funnel, and the flask was heated again in the heating bath for 10 minutes. The flask was cooled again to room temperature, and the liquid condensed on the funnel and on the neck of the flask was washed down into the flask with 5 ml of neutral ethanol. A hydrolysate of the unreacted acetylating reagent was subjected to titration with a 0.5 mol/L potassium hydroxide-ethanol reference solution by using a phenol-phthalein indicator. It should be noted that a blank test was performed simultaneously with the main test and a value calculated from the results of the titration on the basis of the following equation was defined as "hydroxyl value (mg-KOH/g)" (OHV).

$$\text{Hydroxyl value} = (A-B) \times 28.05 \times F1/C + \text{acid value}$$

(A: Amount (ml)) of a 0.5 mol/L potassium hydroxide-ethanol reference solution used in a blank test, B: Amount (ml)) of a 0.5 mol/L potassium hydroxide-ethanol reference solution used in a main test, F1: Factor of a 0.5 mol/L potassium hydroxide-ethanol reference solution, and C: Collection amount (g) of a sample)

The acid value was calculated in accordance with "Acid value (2.3.1-1996)" in "Standard Methods for the Analysis of Fats, Oils and Related Materials, 2003" edited by Japan Oil Chemists. Society. About 5 g of a sample was weighed in a conical flask, and 100 mL of a solvent of ethanol:ethyl acetate=1:1 was added to the sample, followed by the dissolution of the sample. The solution was subjected to titration with a 0.1 mol/L potassium hydroxide-ethanol reference solution by using a phenolphthalein indicator, and a value calculated from the results of the titration on the basis of the following equation was defined as "acid value (mg-KOH/g)."

$$\text{Acid value} = 5.611 \times D \times F2/E$$

(D: Use amount (ml) of a 0.1 mol/L potassium hydroxide-ethanol reference solution, E: Collection amount (g) of a sample, and F2: Factor of a 0.1 mol/L potassium hydroxide-ethanol reference solution)

(iv) Isolation of Constituent Components of Polyglycerin Fatty Acid Ester

In accordance with a method described in "Polyglycerin ester (p. 75)" issued by Sakamoto Yakuhin Kogyo Co., Ltd., a polyglycerin fatty acid ester was decomposed by saponification with KOH-ethanol and the pH was adjusted to 4 with dilute sulfuric acid, followed by extraction of a fatty acid portion with hexane. The aqueous layer was adjusted to a pH of 7 and then subjected to desalting treatment with methanol to provide a polyglycerin portion. The resultant polyglycerin portion was used for the analysis of the average polymerization degree of glycerin and the resultant fatty acid portion was used for the analysis of the constituent fatty acids.

(v) Measurement Method for Average Polymerization Degree of Glycerin in Polyglycerin Fatty Acid Ester The polyglycerin was analyzed by GPC under the conditions of using TSK 2500 PWXL (TOSOH CORPORATION) as a column, using distilled water (in which trifluoroacetic acid was added at 0.1%) as a solvent, setting the flow rate to 1 mL/min, using RID as a detector, setting the temperature to 40° C., and setting the injection amount to 50 μL. A standard curve was prepared by using polyethylene glycol, thereby measuring the weight-average molecular weight (Mw2) of the polyglycerin in terms of polyethylene glycol and the weight-average molecular weight (Mw1) of glycerin. Subsequently, the conversion factor (F) of glycerin was calculated on the basis of the following equation (1).

$$F = 92/Mw1 \tag{1}$$

(where F represents the conversion factor of glycerin and Mw1 represents the weight-average molecular weight of glycerin.)

The "average polymerization degree of glycerin" in the polyglycerin was calculated by using the weight-average molecular weight (Mw2) calculated as described above in the following equation (2).

$$n = (Mw2 \times F - 18)/74 \tag{2}$$

(where n represents the weight-average polymerization degree of glycerin, F represents the conversion factor of glycerin, and Mw2 represents the weight-average molecular weight of polyglycerin.)

(vi) Composition of Constituent Fatty Acids of Polyglycerin Fatty Acid Ester

The composition of the constituent fatty acids of each polyglycerin fatty acid ester was measured by the same method as the composition of the constituent fatty acids of each fat or oil.

(vii) Yield Calculation Method

The yield (%) of the refined fat or oil composition obtained by the production method and solid-liquid separation method of the present invention was calculated by the following equation.

Mass of refined fat or oil composition/mass of fat or oil composition×100(%)

(Preparation of Fat or Oil)

Fat or oil composition A: 3,000 g of fatty acids obtained by hydrolyzing rapeseed oil were mixed with 480 g of glycerin, and the resulting mixture was subjected to an esterification reaction by using an immobilized 1,3-selective lipase (manufactured by Novo Nordisk Pharmaceutical Industries, Inc.) as a catalyst. After the lipase preparation was removed by filtration, the product after completion of the reaction was subjected to molecular distillation, followed by decoloration, water washing, and then deodorization at 235° C. for 1 hour, thereby yielding a diacylglycerol (DAG)-rich fat or oil composition A.

Fat or oil composition B: 1,000 g of fatty acids obtained by hydrolyzing sunflower oil were mixed with 155 g of glycerin, and the resulting mixture was subjected to an esterification reaction by using an immobilized 1,3-selective lipase (manufactured by Novo Nordisk Pharmaceutical Industries, Inc.) as a catalyst. After the lipase preparation was removed by filtration, the product after completion of the reaction was subjected to molecular distillation, followed by decoloration, water washing, and then deodorization at 235° C. for 1 hour, thereby yielding a fat or oil composition B containing diacylglycerol (DAG) at a high content.

Table 1 shows the glyceride compositions and fatty acid compositions of the fat or oil compositions A and B.

TABLE 1

| Fat or oil composition | Glyceride composition (%) | | | | Fatty acid composition (%) | | | | | | |
|---|---|---|---|---|---|---|---|---|---|---|---|
| | MAG | DAG | TAG | FFA | C16:0 | C18:0 | C18:1 | C18:2 | C18:3 | C20:0 | Others |
| A | 1.1 | 83.2 | 15.7 | 0.1 | 4.1 | 1.9 | 60.3 | 19.8 | 11.6 | 0.6 | 1.7 |
| B | 0.2 | 88.0 | 11.8 | 0.1 | 6.1 | 2.9 | 35.2 | 53.4 | 0.2 | 0.2 | 1.9 |

(Polyglycerin Fatty Acid Ester)

PGE 1 to PGE 5 (manufactured by Taiyo Kagaku Co., Ltd.) and a decaglycerin fatty acid ester THL-15 (manufactured by Sakamoto Yakuhin Kogyo Co. Ltd.) were used as polyglycerin fatty acid esters. Table 2 shows the average polymerization degree of glycerin, hydroxyl value, and fatty acid composition of each of the polyglycerin fatty acid esters.

TABLE 2

| PGE No. | Polymerization degree of glycerin | Hydroxyl value [mg-KOH/g] | Fatty acid composition (%) | | | | | |
|---|---|---|---|---|---|---|---|---|
| | | | C10:0 | C12:0 | C14:0 | C16:0 | C18:0 | C18:1 |
| PGE 1 | 6 | 22.4 | 20 | 8 | | 29 | 9 | 34 |
| PGE 2 | 36 | 23.0 | | | | 100 | | |
| PGE 3 | 36 | 21.4 | 20 | | | 30 | 50 | |
| PGE 4 | 36 | 18.4 | 20 | 8 | | 29 | 9 | 34 |
| PGE 5 | 25 | 18.4 | 20 | 8 | | 29 | 9 | 34 |
| THL 15 | 10 | 6.3 | 20 | | | 60 | | 20 |

Examples 1 to 9 and Comparative Examples 1 to 14

The polyglycerin fatty acid esters were added to the fat or oil composition A or B as prepared above at the ratios shown in Table 3, and the mixtures were heated to 70° C. to prepare homogeneous liquids. The liquids were dispensed in centrifuge tubes in amounts of 100 g, allowed to stand still in a 3° C.-, 5° C.-, 8° C.-, or 10° C.-thermostatic chamber for 3 days to be cooled, and then crystals precipitated were separated by centrifugation at the same temperatures at a rotation frequency of 3,000 r/min for 20 minutes to collect liquid portions. Table 3 shows the yields of the liquid portions.

The collected liquid portions were dispensed in glass vials (SV-20, manufactured by NICHIDEN RIKA GLASS CO., LTD.) in amounts of 10 g, and the vials were covered with lids and allowed to stand still in a 0° C.-thermostatic chamber for 7 days to crystallize the liquid portions. The vials were transferred to a 20° C.- or 18° C.-thermostatic chamber, and 8 hours later, the presence or absence of crystals were evaluated by visual observation in accordance with the following criteria.

(Evaluation Criteria of Presence or Absence of Crystals)
   3: Completely dissolved and clear
   2: Slight residual crystals
   1: Visible undissolved crystals

TABLE 3

| | | Example 1 | Example 2 | Example 3 | Example 4 | Example 5 |
|---|---|---|---|---|---|---|
| Fat or oil composition | | A | A | A | A | A |
| PGE | PGE No. | PGE 2 | PGE 2 | PGE 3 | PGE 3 | PGE 4 |
| | Polymerization degree of glycerin | 36 | 36 | 36 | 36 | 36 |
| | Addition amount of PGE | 10 ppm | 200 ppm | 10 ppm | 20 ppm | 10 ppm |
| Cooling/separation temperature | | 10° C. | 10° C. | 8° C. | 8° C. | 8° C. |
| Yield | | 85.9% | 92.2% | 89.7% | 86.6% | 85.1% |
| Solubility at 20° C. | | 3 | 3 | 3 | 3 | 3 |
| Solubility at 18° C. | | 3 | 2 | 3 | 3 | 3 |

| | | Example 6 | Example 7 | Example 8 | Example 9 | Comparative Example 1 |
|---|---|---|---|---|---|---|
| Fat or oil composition | | A | A | A | B | A |
| PGE | PGE No. | PGE 4 | PGE 5 | PGE 5 | PGE 3 | No addition |
| | Polymerization degree of glycerin | 36 | 25 | 25 | 36 | — |
| | Addition amount of PGE | 1,000 ppm | 10 ppm | 1,000 ppm | 50 ppm | — |
| Cooling/separation temperature | | 3° C. | 8° C. | 3° C. | 10° C. | Unseparated |
| Yield | | 81.8% | 85.1% | 77.1% | 84.2% | — |
| Solubility at 20° C. | | 3 | 3 | 3 | 3 | 1 |
| Solubility at 18° C. | | 2 | 3 | 2 | 3 | 1 |

TABLE 3-continued

|  |  | Comparative Example 2 | Comparative Example 3 | Comparative Example 4 | Comparative Example 5 | Comparative Example 6 |
|---|---|---|---|---|---|---|
| Fat or oil composition | | A | A | A | A | A |
| PGE | PGE No. | No addition | No addition | THL-15 | THL-15 | THL-15 |
|  | Polymerization degree of glycerin | — | — | 10 | 10 | 10 |
|  | Addition amount of PGE | — | — | 10 ppm | 10 ppm | 1,000 ppm |
| Cooling/separation temperature | | 10° C. | 5° C. | 8° C. | 5° C. | 5° C. |
| Yield | | *1Non-separable | *2Non-separable | *1Non-separable | *2Non-separable | 22.9% |
| Solubility at 20° C. | | — | — | — | — | 3 |
| Solubility at 18° C. | | — | — | — | — | 3 |

|  |  | Comparative Example 7 | Comparative Example 8 | Comparative Example 9 | Comparative Example 10 | Comparative Example 11 |
|---|---|---|---|---|---|---|
| Fat or oil composition | | A | A | A | A | A |
| PGE | PGE No. | THL-15 | PGE 1 | PGE 1 | PGE 1 | PGE 1 |
|  | Polymerization degree of glycerin | 10 | 6 | 6 | 6 | 6 |
|  | Addition amount of PGE | 1,000 ppm | 10 ppm | 10 ppm | 1,000 ppm | 2,000 ppm |
| Cooling/separation temperature | | 3° C. | 8° C. | 5° C. | 5° C. | 5° C. |
| Yield | | *2Non-separable | *1Non-separable | *2Non-separable | 13.1% | 48.8% |
| Solubility at 20° C. | | — | — | — | 3 | 3 |
| Solubility at 18° C. | | — | — | — | 3 | 3 |

|  |  | Comparative Example 12 | Comparative Example 13 | Comparative Example 14 |
|---|---|---|---|---|
| Fat or oil composition | | A | B | B |
| PGE | PGE No. | PGE 1 | No addition | No addition |
|  | Polymerization degree of glycerin | 6 | — | — |
|  | Addition amount of PGE | 1,000 ppm | — | — |
| Cooling/separation temperature | | 3° C. | Unseparated | 10° C. |
| Yield | | *2Non-separable | — | *1Non-separable |
| Solubility at 20° C. | | — | 1 | — |
| Solubility at 18° C. | | — | 1 | — |

*1Non-separable due to occurrence of turbidity
*2Non-separable due to solidification The results shown in Table 3 found that, according to the method of the present invention, it is possible to efficiently separate and remove components having a high melting point in a fat or oil to provide a refined fat or oil composition which is clear at 20° C. or 18° C. and has high solubility at room temperature even if crystals are precipitated at low temperature. It is possible to separate efficiently even with a small addition amount of the polyglycerin fatty acid ester.

On the other hand, the results of Comparative Examples reveal that crystals precipitated cannot be separated, or the yield is low even if the crystals can be separated.

The invention claimed is:
1. A production method for a refined fat or oil composition, the method comprising:
(1) adding a polyglycerin fatty acid ester having an average polymerization degree of glycerin of 25 or more to a fat or oil composition containing 40 mass % or more of diacylglycerol, followed by cooling, thereby precipitating a crystal; and
(2) separating the crystal precipitated in the adding from a liquid portion, thereby obtaining the refined fat or oil composition containing 45 mass % or more of diacylglycerol,
wherein:
the polyglycerin fatty acid ester having the average polymerization degree of glycerin of 25 or more is added in an amount of from 10 to 1,000 ppm relative to an amount of the fat or oil composition;
a content of saturated fatty acids in constituent fatty acids of the polyglycerin fatty acid ester is from 50 to 100 mass %; and
a yield of the method, expressed as a mass of the refined fat or oil composition with respect to a mass of the fat or oil composition before the polyglycerin fatty acid ester is added, is at least 77.1%.

2. The production method for a refined fat or oil composition according to claim 1, wherein the polyglycerin fatty acid ester having the average polymerization degree of glycerin of 25 or more is added in an amount of from 10 to 100 ppm relative to an amount of the fat or oil composition.

3. The production method for a refined fat or oil composition according to claim 1, wherein the average polymerization degree of glycerin in the poly glycerin fatty acid ester is from 25 to 45.

4. The production method for a refined fat or oil composition according to claim 1, wherein the average polymerization degree of glycerin in the polyglycerin fatty acid ester is from 25 to 36.

5. The production method for a refined fat or oil composition according to claim 1, wherein the content of saturated fatty acids in constituent fatty acids of the polyglycerin fatty acid ester is from 66 to 100 mass %.

6. The production method for a refined fat or oil composition according to claim 1, wherein the constituent fatty acids of the polyglycerin fatty acid ester comprise from 30 to 100 mass % of saturated fatty acids each having from 16 to 18 carbon atoms.

7. The production method for a refined fat or oil composition according to claim 1, wherein the constituent fatty acids of the polyglycerin fatty acid ester comprise from 50 to 100 mass % of saturated fatty acids each having from 16 to 18 carbon atoms.

8. The production method for a refined fat or oil composition according to claim 1, wherein a hydroxyl value of the polyglycerin fatty acid ester is 80 mg-KOH/g or less.

9. The production method for a refined fat or oil composition according to claim 1, wherein a hydroxyl value of the polyglycerin fatty acid ester is from 3 to 80 mg-KOH/g.

10. The production method for a refined fat or oil composition according to claim 1, wherein the fat or oil composition is cooled at a temperature of from −3° C. to 20° C.

11. The production method for a refined fat or oil composition according to claim 1, wherein the content of the diacylglycerol in the refined fat or oil composition is from 50 to 98 mass %.

12. The production method for a refined fat or oil composition according to claim 1, wherein the content of saturated fatty acids in constituent fatty acids of the diacylglycerol in the fat or oil composition is from 1 to 15 mass %.

13. A solid-liquid separation method for a fat or oil composition, the method comprising:

(1) adding a polyglycerin fatty acid ester having an average polymerization degree of glycerin of 25 or more to a fat or oil composition containing 40 mass % or more of diacylglycerol, followed by cooling, thereby precipitating a crystal; and (2) separating the crystal precipitated in the adding and a liquid portion, thereby obtaining a refined fat or oil composition containing 45 mass % or more of diacylglycerol, wherein:

the polyglycerin fatty acid ester having the average polymerization degree of glycerin of 25 or more is added in an amount of from 10 to 1,000 ppm relative to an amount of the fat or oil composition;

a content of saturated fatty acids in constituent fatty acids of the polyglycerin fatty acid ester is from 50 to 100 mass %; and a yield of the method, expressed as a mass of the refined fat or oil composition with respect to a mass of the fat or oil composition before the polyglycerin fatty acid ester is added, is at least 77.1%.

14. The production method for a refined fat or oil composition according to claim 1, wherein the crystal comprises a fat or oil containing saturated fatty acids each having from 14 to 24 carbon atoms as constituent fatty acids.

15. The production method for a refined fat or oil composition according to claim 1, wherein the polyglycerin fatty acid ester having the average polymerization degree of glycerin of 25 or more is added in an amount of from 10 to 200 ppm relative to an amount of the fat or oil composition.

16. The production method for a refined fat or oil composition according to claim 1, wherein the polyglycerin fatty acid ester having the average polymerization degree of glycerin of 25 or more is added in an amount of from 10 to 50 ppm relative to an amount of the fat or oil composition.

17. The production method for a refined fat or oil composition according to claim 1, wherein the content of saturated fatty acids in constituent fatty acids of the diacylglycerol in the fat or oil composition is 20 mass % or less.

18. The production method for a refined fat or oil composition according to claim 1, wherein the content of saturated fatty acids in constituent fatty acids of the diacylglycerol in the fat or oil composition is 15 mass % or less.

19. The production method for a refined fat or oil composition according to claim 1, wherein the content of saturated fatty acids in constituent fatty acids of the diacylglycerol in the fat or oil composition is 10 mass % or less.

\* \* \* \* \*